United States Patent [19]
Yamanashi

[11] 3,840,939
[45] Oct. 15, 1974

[54] METHOD AND APPARATUS FOR CUTTING AND REMOVING RED MEAT OF FISH BODIES

[75] Inventor: Norio Yamanashi, Shimizu, Japan

[73] Assignee: Toyo Seikan Kaisha, Ltd., Tokyo, Japan

[22] Filed: Feb. 2, 1972

[21] Appl. No.: 222,728

[30] Foreign Application Priority Data
May 11, 1971 Japan.............................. 46-31365
May 11, 1971 Japan.............................. 46-31366
May 11, 1971 Japan.............................. 46-37582
May 11, 1971 Japan.............................. 46-37583

[52] U.S. Cl. ................................................. 17/52
[51] Int. Cl. .......................................... A22c 29/00
[58] Field of Search ........................................ 17/52

[56] References Cited
UNITED STATES PATENTS
| | | | |
|---|---|---|---|
| 3,077,632 | 2/1963 | Brandes et al. | 17/52 X |
| 3,187,375 | 6/1965 | Williamson | 17/52 X |
| 3,460,193 | 8/1969 | Yoshida | 17/52 X |
| 3,611,478 | 10/1971 | Lockerby | 17/52 |

Primary Examiner—Antonio F. Guida
Attorney, Agent, or Firm—Fitzpatrick, Cella, Harper & Scinto

[57] ABSTRACT

Apparatus for removing the red meat of a fish body comprises conveyor means for successively conveying longitudinally split sections of a fish body, red meat removing means located on one side of the conveyor means and including cutter means for cutting and removing the red meat, means including a cam for displacing the cutter means with respect to the red meat in accordance with the configuration thereof, and a driving mechanism for the cam including means which functions to vary the rotary speed of the cam in accordance with the size of the fish body and to stop the cam for a predetermined interval in a definitely timed relationship with the conveyance of the fish body.

The red meat is removed by a method comprising the steps of longitudinally splitting the fish body into four sections to expose the red meat, cutting the surface layer of the exposed red meat to remove small bones contained therein, cutting the interface between the red meat and the white meat except the deepest portion of the red meat and finally cutting the deepest portion.

11 Claims, 19 Drawing Figures

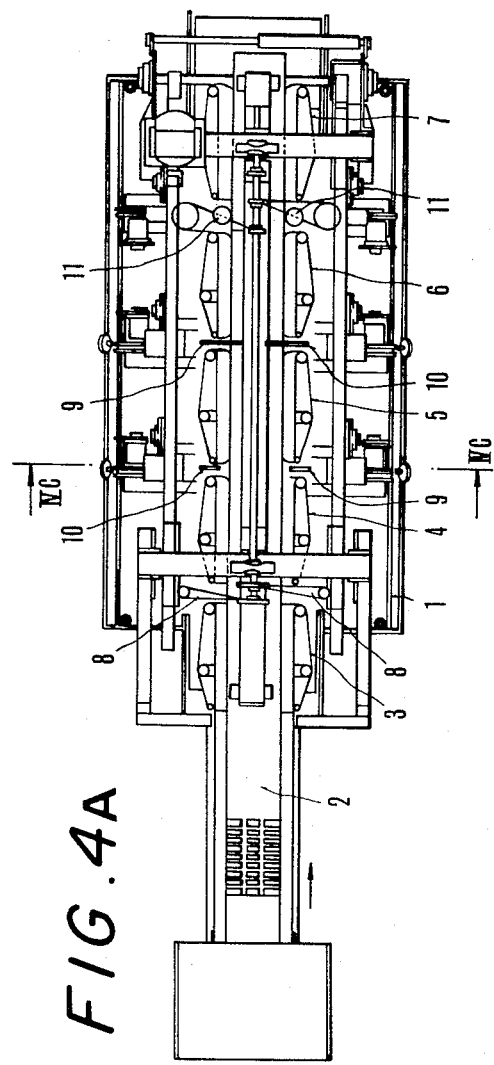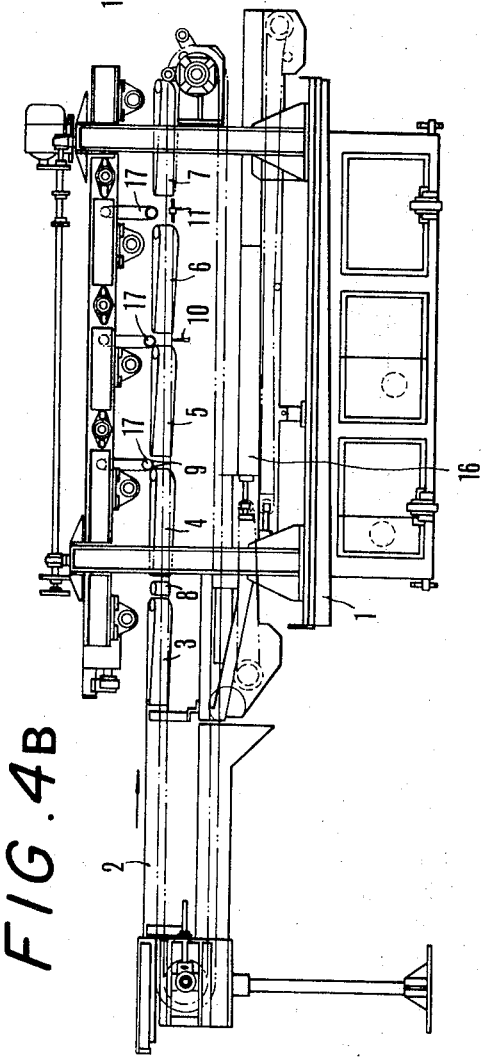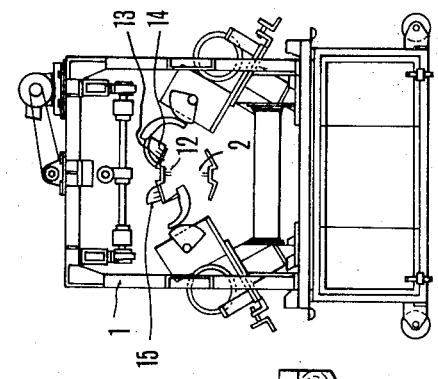

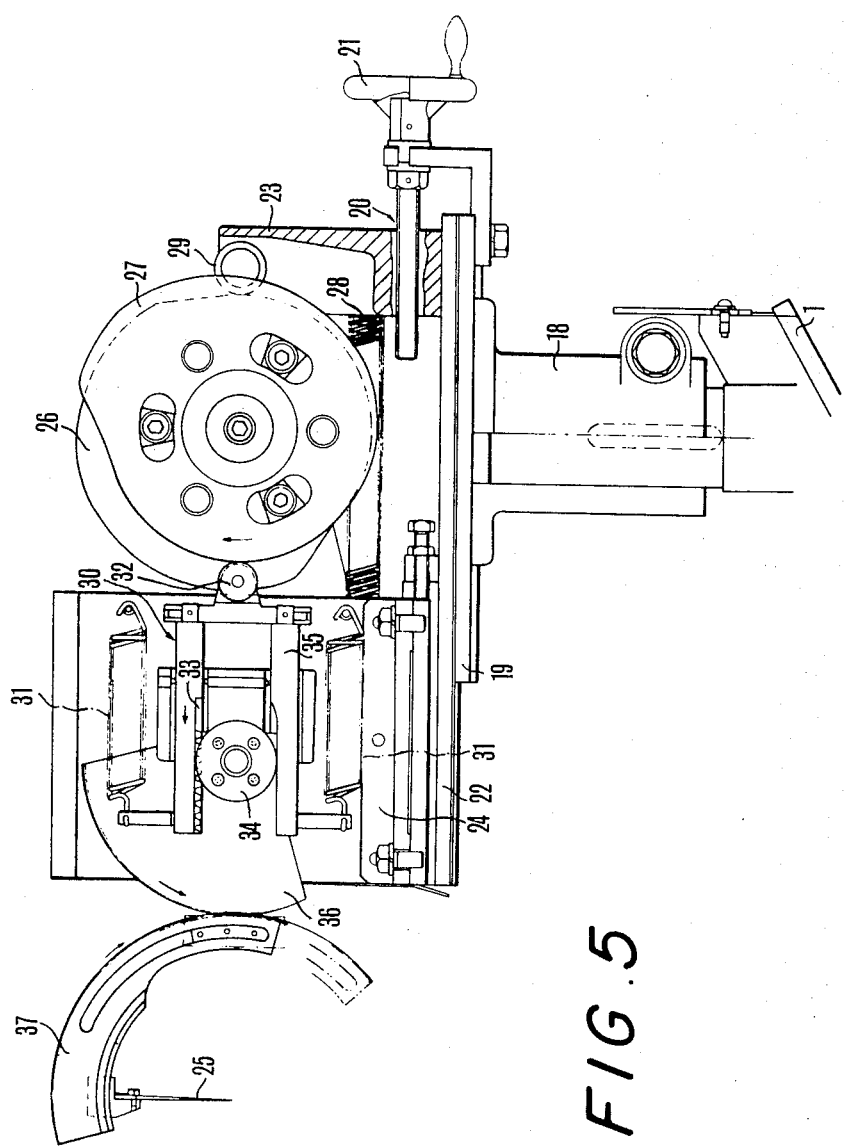

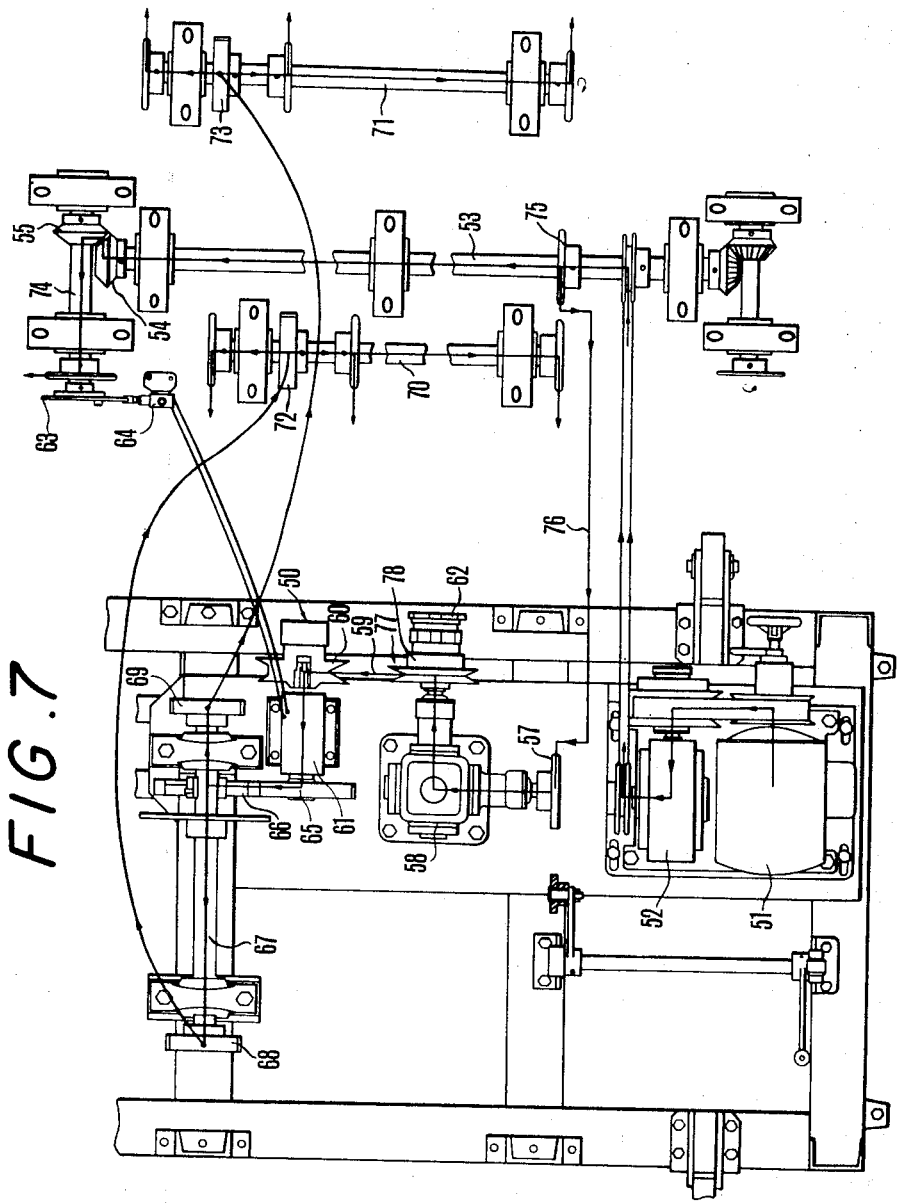

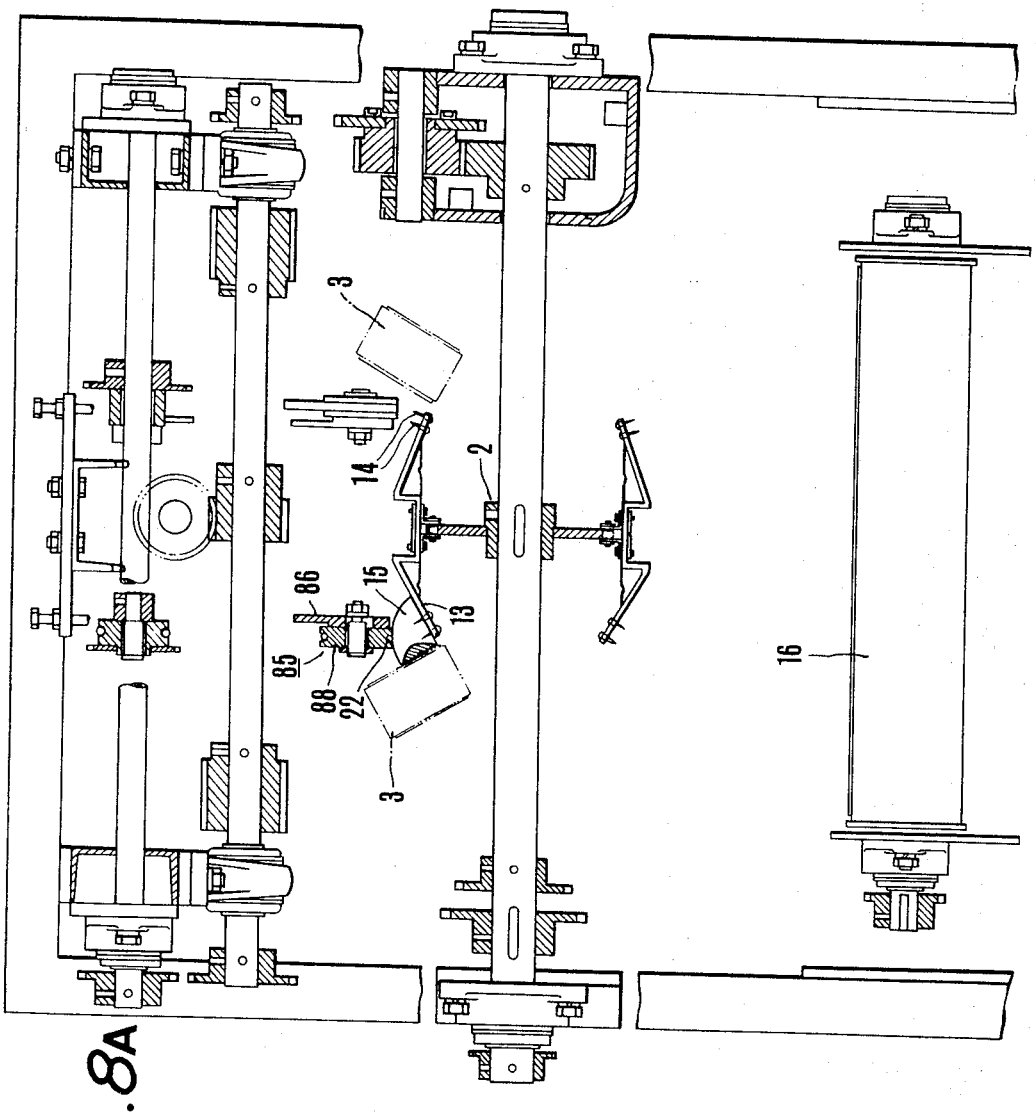

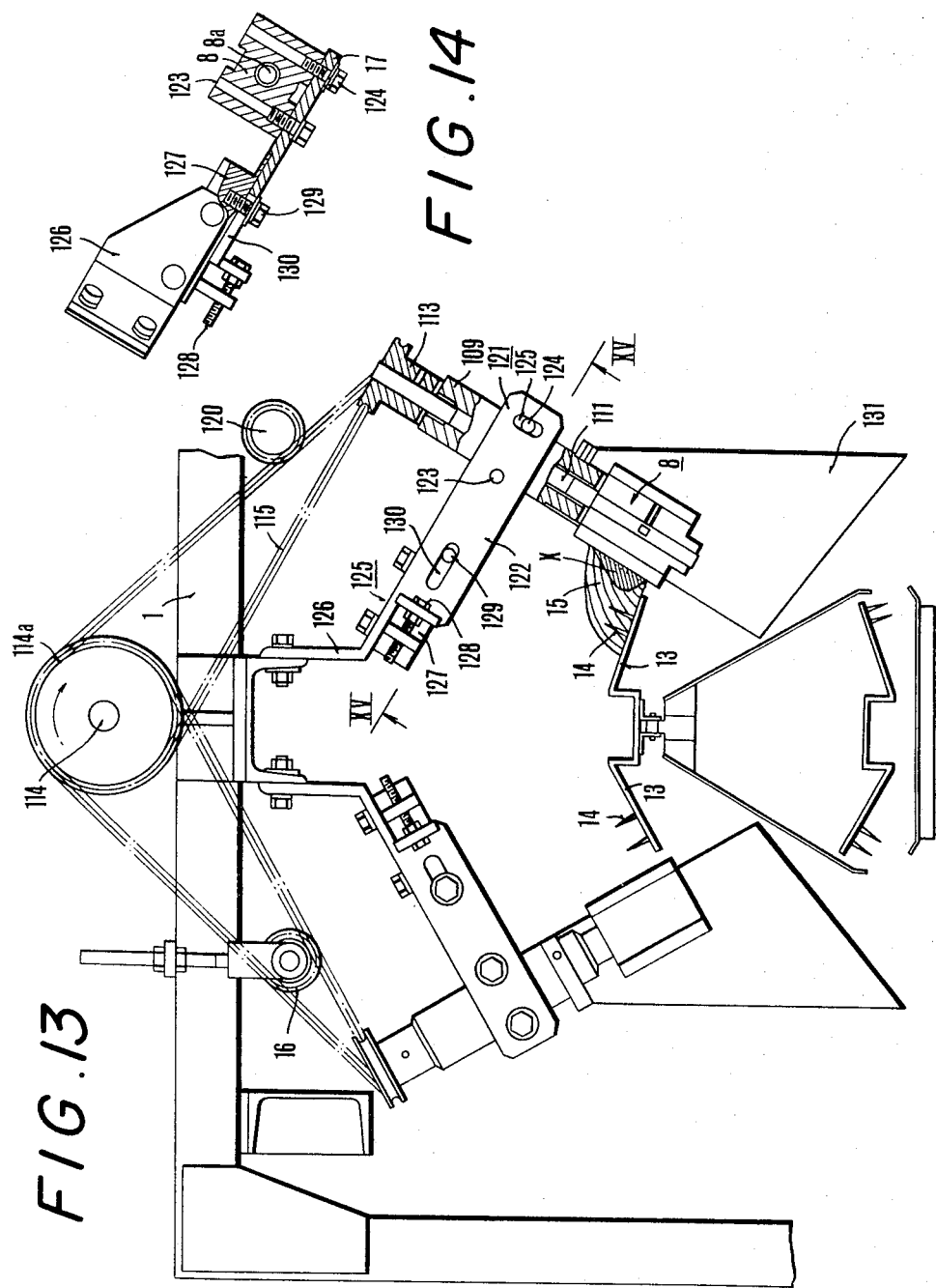

3,840,939

METHOD AND APPARATUS FOR CUTTING AND REMOVING RED MEAT OF FISH BODIES

BACKGROUND OF THE INVENTION

This invention relates to a method and apparatus for continuously and automatically removing the red meat from fishes of large size such as tuna fishes.

A fish body usually includes the red meat constituted by albumen different from that of the white meat. Where the meat of fish, especially a large fish, such as a tuna fish, is canned, inclusion of the red meat is not permissible, so that it is necessary to remove the red meat. The removed red meat is processed independently to prepare secondary products.

At present, removal of the red meat is generally relied upon manual operations, for example by cutting with a knife. Since the red meat removing operation should be performed carefully so that no red meat remains unremoved and not to remove excessively the white meat in order to avoid decrease in the yield of the white meat. This operation requires a considerable time and labor. Actually, more than one half of the workmen are engaging this removing operation, thus presenting a serious problem to the automation of canning operation.

The applicant has already proposed an automatic method and apparatus for efficiently removing the red meat as disclosed in my copending U.S. Pat. application Ser. No. 30446 filed on Apr. 21, 1970. As diagrammatically shown in FIG. 1 of the accompanying drawings, the red meats X are contained in the white meats Y at portions symmetrically with respect to a vertical plane normal to the longitudinal axis of the fish body 5. When the fish body is split longitudinally into four sections 5 along a vertical line B — B and a horizontal line A — A, the red reat Z will appear on the surface layer in each section 5 and after the large bones X have been removed, the small bones T will appear on the surface layer of the exposed red meat X. The applicant has already proposed a method and apparatus for automatically removing the small bones and red meat from respective sections 5. According to this method and apparatus, the sections of the fish body are mounted on supporting plates secured to a conveyor, the red meats are removed by cutting the same by means of a pair of upper and lower knives and then by cutting the deepest portions of the red meats by rotary cutters as diagrammatically shown in FIG. 2B. With this method and apparatus it is possible to greatly save the labor and improve the efficiency of removing the red meats.

According to the afore-mentioned apparatus the cutting depths of the upper and lower knives and the rotary cutters are controlled by cams respectively. Since it has been necessary to use cams of different dimensions dependent upon the size of the fish body, it is necessary to prepare a large number of cams of different dimensions and the operation of exchanging the cams is troublesome.

SUMMARY OF THE INVENTION

Accordingly, it is an object of this invention to provide an improved apparatus capable of efficiently removing red meats of different dimensions without the necessity of exchanging the cams for operating the upper and lower knives and rotary cutters.

Another object of this invention is to provide an improved apparatus for cutting and removing the red meat of a fish body including means for positively holding the fish body while it is processed to cut and remove the red meat.

A further object of this invention is to provide an improved apparatus for cutting and removing the red meat of a fish body including a novel rotary cutter for removing small bones, said apparatus including means to move the rotary cutter toward and away from the red meat and means for varying the cutting angle of the rotary cutter.

Still further object of this invention is to provide an improved rotary cutter capable of efficiently removing small bones contained in the red meat.

Yet another object of this invention is to provide a method of removing the red meat of a fish body at a high efficiency.

According to one aspect of this invention, there is provided apparatus for removing red meat of a fish body comprising conveyor means for successively conveying longitudinally split sections of a fish body, red meat removing means located on one side of the conveyor means and including cutter means for cutting and removing the red meat, means including a cam for displacing the cutter means with respect to the red meat in accordance with the configuration thereof, and a driving mechanism for the cam including means which functions to vary the rotary speed of the cam in accordance with the size of the fish body and to stop the cam for a predetermined interval in a definitely timed relationship with the conveyance of the fish body.

According to another aspect of the invention, there is provided a method of removing the red meat of a fish body, comprising the steps of longitudinally splitting the fish body into four sections to expose the red meat, cutting the surface layer of the red meat to remove small bones contained therein, cutting the interface between the red meat and the white meat except the deepest portion of the red meat and finally cutting the deepest portion.

According to still further aspect of this invention the rotary cutter utilized to remove small bones contained in the red meat is driven by a driving mechanism including means to move the rotary cutter toward and away from the red meat and means to vary the cutting angle of the rotary cutter.

The rotary cutter includes a plurality of cutting blades, each having a serrated cutting edge for efficiently removing the small bones.

BRIEF DESCRIPTION OF THE DRAWINGS

Further objects and advantages of the invention can be more fully understood from the following detailed description taken in conjunction with the accompanying drawings, in which:

FIG. 4A shows a plan view of one example of the automatic red meat cutting and removing apparatus embodying the invention;

FIG. 4B is a side view of the apparatus shown in FIG. 4A;

FIG. 4C is a cross-sectional view of the apparatus shown in FIG. 4A taken along a line IVC — IVC;

FIG. 5 is an enlarged side view of an upper knife and its adjusting mechanism;

FIG. 7 is a diagrammatic representation of the driving mechanism utilized in the apparatus shown in FIGS. 4A to 4C;

FIG. 13 is a cross-sectional view of the apparatus corresponding to FIG. 9 showing a small bone removing device incorporated with a mechanism for shifting the rotary cutter toward and away from the fish body section and for varying the cutting angle of the rotary cutter; and FIG. 14 shows a cross-section, partly in section, of the mechanisms shown in FIG. 13 taken along a line XV — XV.

DESCRIPTION OF THE PREFERRED EMBODIMENTS

Figure 1:
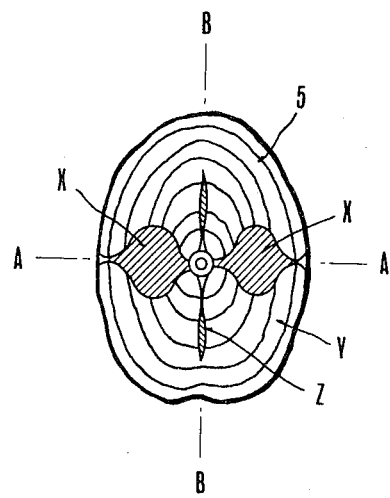
FIG. 1 is a cross-sectional view of a fish body showing the distribution of the red meat and bones therein.

FIGS. 4 to 7 illustrate a preferred embodiment of this invention. The apparatus shown therein is designed to simultaneously remove red meats from two sections of fish bodies which are prepared by longitudinally splitting the fish body into four sections as has been described above in connection with FIG. 1. With reference first to FIGS. 4A and 4C, the apparatus shown therein comprises a frame 1, a conveyor 2 mounted on the frame for successively conveying sections of the fish body from the left to the right as viewed in FIGS. 4A and 4B and side conveyors 3, 4, 5, 6 and 7 mounted on the opposite sides of conveyor 2. Rotary cutters 8 for removing small bones, upper and lower knives 9 and 10 for cutting the red meats in the form of a letter V, and rotary cutters 11 for cutting the deepest portions of the red meats are disposed respectively between side conveyors 3 and 4, 4 and 5, 5 and 6, and 6 and 7. Upper knives 9 and lower knives 10 are positioned at spaced apart positions along the length of a conveyor 2 and the order of these knives are reversed on the opposite sides of the conveyor 2 as shown in FIG. 4A. Conveyor 2 comprises an endless chain 12 on which a plurality of fish section supporting plates 13 are mounted at a definite spacing. A plurality of needles 14 are secured on the upper surface of each plate 13 so as to removably hold a section of fish body 15 by several supporting plates with the red meat of the section faced outwardly. In this manner, a plurality of sections of the fish body are mounted at a definite spacing.

Figures 2A, 2B:
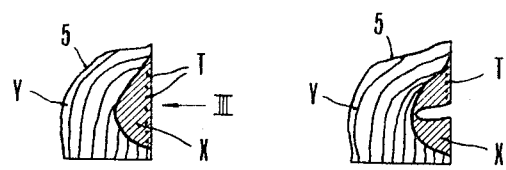
FIG. 2A shows an end view of a section obtained by splitting longitudinally into four sections the fish body shown in FIG. 1 along a horizontal line A — A and a vertical line B — B.
FIG. 2B shows a manner of cutting the deepest portion of the red meat.
Figure 3:
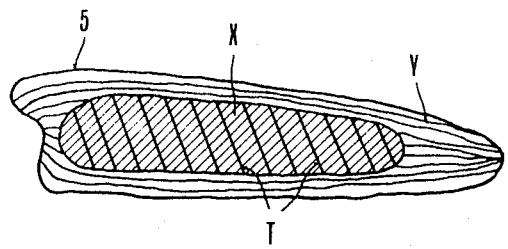
FIG. 3 shows a side view of the section shown in FIG. 2A as viewed from the side indicated by arrow III.

While the sections of the fish body is conveyed by conveyor 2 and supported by either one or both of side conveyors 3 and 4, small bones are removed and the surface layer of the red meat is removed to provide a smooth and flat surface by the action of rotary cutters 8. Then, the section of the fish body is obliquely cut toward the center thereof successively from upper and lower sides by upper knife 9 (or lower knife 10) thence by lower knife 10 (or upper knife 9). Thus, the interface between the white and red meats is cut in the form of a letter V. Thereafter, while the section of the fish body 15 is supported by either one or both of the side conveyors 6 and 7, the deepest portion of the red meat X located at substantially the center thereof is removed by the action of rotary cutters 11 as shown in FIG. 2B. Since the interface between the white and red meats has been cut by the upper and lower knives 9 and 10 all portions of the red meats are removed. The sections of the fish body from which the red meats have been removed are discharged from conveyor 2 at the right-hand end thereof as viewed in FIGS. 4A and 4B.

As shown in FIG. 4B, beneath conveyor 2 is provided another conveyor 16 for discharging red meats and small bones removed from the sections of the fish body. Rollers 17 are provided for positively holding the sections 15 of fish body while they are cut by the upper and lower knives 9 and 10 and by the rotary cutters 11 to remove the red meats.

As shown in FIG. 5, the upper knife 9 provided with the follow-up mechanism of this invention has a base 19 which is mounted on frame 1 to be adjustable in the vertical direction by a vertical position adjusting mechanism 18. A slide plate 22 including an upright bracket 23 is slidably mounted on base 19. Slide plate 22 is moved in a direction perpendicular to the direction of movement of the sections of the fish body which are conveyed by conveyor 2 by rotating an operating wheel 21 of a mechanism for adjusting the cutting depth 20. A knife support 24 is mounted on slide plate 22 to be slidable in a direction perpendicular to the movement of the sections of the fish body. First and second cams 26 and 27 for adjusting the inclination angle and the cutting depth of a knife blade 25 is coaxially mounted on the knife support 24. Cams 26 and 27 are rotated at a variable speed by a driving mechanism to be described later.

When the rotational speeds of the cams are increased, after one complete revolution, the cams are stopped for an interval equal to the difference in the time required for making one complete revolution at a faster speed and at the slowest speed respectively. Knife support 24 is urged toward bracket 23 by means of a spring 28 so as to urge a cam follower roller 29 carried by bracket 23 against the peripheral surface of the first cam 26. Further, an operating member 30 is slidably mounted on knife support 24 and a tension spring 31 is provided between operating member 30 and support 24 to urge a cam follower roller 32 carried by the operating member 30 against the peripheral surface of the second cam 27. The operating member 30 is formed with a rack 33 which meshes with a pinion 34 supported by a guide 35 confronting rack 33. A sector gear 36 is coaxially mounted on the shaft of pinion 34. Further, the knife support 24 rotatably carries an arcuate holder 37 which meshes with sector gear 36. Knife 25 is removably mounted on arcuate holder 37.

With this construction as the first cam 26 is rotated, the knife support 24 is moved in a direction perpendicular to the direction of conveyance of the sections of the fish body to vary the depth of cutting into the red meat of knife 25 so as to match with the size or configuration of the red meat. Similarly, as the second cam 26 is rotated, the operating member 30 is moved in the direction perpendicular to the direction of conveyance of the sections of the fish body to rotate holder 37 through rack 33 and pinion 34 whereby the cutting angle of knife 25 with respect to the red meat is adjusted to match the configuration thereof. These cams are rotated one complete revolution for each fish section in a timed relationship with a definite conveyor speed. For this reason, the rotary speeds of cams 26 and 27 are decreased for larger fish or red meat, whereas increased for smaller red meat. As the conveyor speed is constant, when the rotary speeds of the cams are decreased, longer length of the red meat is cut, whereas with increased cam speed, shorter length of the red meat is cut. Further, the inclination angle of knife blade 25 is varied in accordance with the size or configuration of the red meat to completely remove it. As above described, where the rotary speed of the cams is high, the cams are stopped for a definite interval corresponding to the difference in the time required for making one complete revolution at a high speed and at the lowest speed so that the cutting-in of the knife blade 25 into the fish body can be initiated always at the same time instant.

In this manner, by varying the rotational speed of the first and second cams 26 and 27 as above described, it is possible to cut the red meat with the depth of cutting and the inclination angle of the knife blade substantially corresponding to the size of the fish body or the red meat thereby efficiently removing the red meat without removing any appreciable quantity of the white meat.

In addition to the adjustment of the rotary speed of the cams, the slide plate 22 is moved toward and away in the direction perpendicular to the direction of conveyance of the fish body by operating the cutting depth adjusting mechanism 20. More particularly, for a larger red meat the knife blade 25 is caused to cut deeply into the red meat over its full width, whereas for a smaller red meat, the cutting depth of the blade 25 is made small. At the same time, the base 19 is adjusted in the vertical direction by the vertical position adjusting mechanism 18. More particularly, for a larger red meat the position of the knife blade 25 is raised, whereas for a smaller red meat the position of the blade 25 is lowered whereby more accurate cutting-in can be made corresponding to the size and configuration of the red meat.

While in the foregoing description, the construction and operation of the upper knife 9 were explained, it should be understood that the lower knife 10 can be operated similarly except that the relative position between rack 33 and guide 35 of the operating member 30 is reversed and that the sector gear 36 and holder 37 are brought to the lower side.

Figure 6:
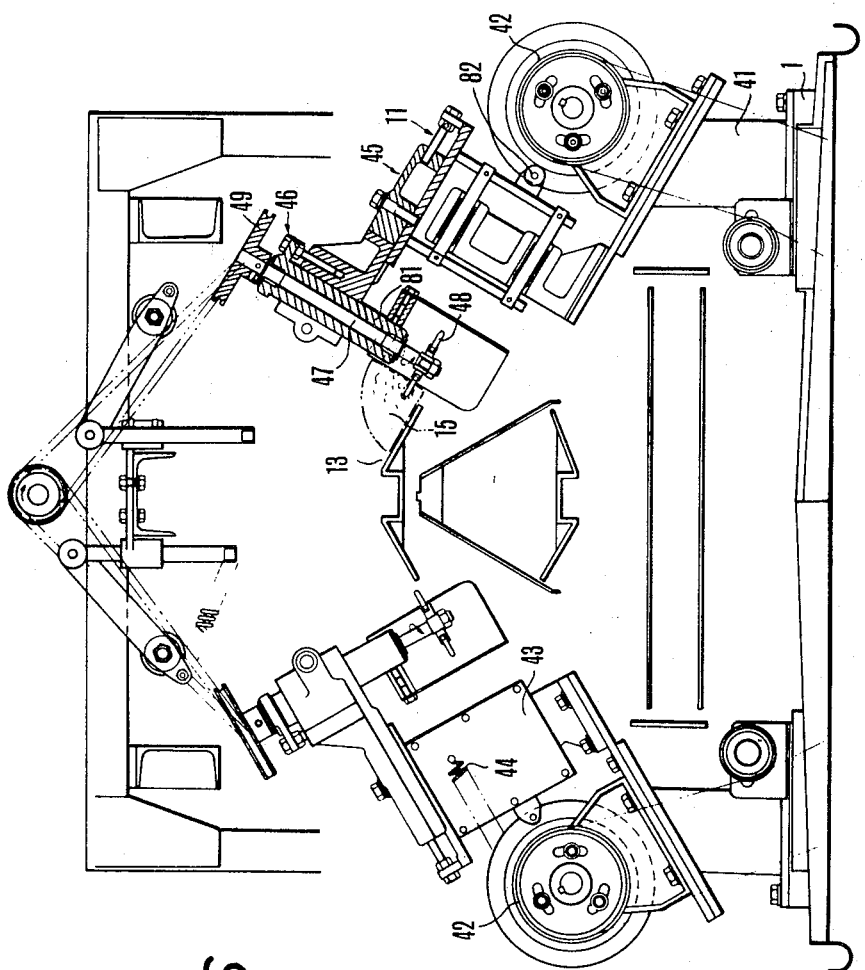
FIG. 6 is an enlarged side view, partly broken away and partly in section, of rotary cutters adapted to cut the deepest portions of the red meat.

As shown in FIG. 6, the rotary cutter 11 for cutting the deepest portion of the red meat and provided with a follow up mechanism comprises a third cam 42 which is mounted on frame 1 by means of a supporting member 41 for varying the cutting-in depth of the cutter 11 into the red meat. Cam 42 is rotated at a variable speed by a driving mechanism to be described later. Again, when the rotary speed of cam 42 is increased, cam 42 is always stopped for a predetermined interval after each one complete revolution. A movable member 43 is mounted upon supporting member 41 to be slidable in a direction perpendicular to the direction of conveyance of the fish body. A spring 44 is interposed between the movable member 43 and supporting member 41 to urge a cam follower roller 82 carried by movable member 43 against the peripheral surface of third cam 42. A cutter bearing 81 is mounted on movable member 43 through a left and right position adjusting mechanism 45 which moves the cutter bearing 81 in a direction perpendicular to the direction of conveyance of the fish body by the operation of a screw and a vertical position adjusting mechanism 46 which moves the cutter bearing 81 in the vertical direction. The bearing 81 rotatably supports a rotary shaft 47. A rotary cutter 48 is secured to the lower end of shaft 47 and pulley 49 for driving cutter 48 is secured to the upper end of shaft 47.

When the third cam 42 is rotated movavle member 43 is moved in the direction perpendicular to the direction of conveyance of the fish body so as to vary the depth of cutting of the rotary cutter 48 into the red meat in accordance with the size and configuration of the red meat thereby cutting the deepest portion thereof. The third cam 42 is rotated one complete revolution for the length of one section of the fish body in a timed relationship with respect to the constant conveyor speed. Accordingly, the rotary speed of cam 42 is decreased for a larger red meat whereas increased for a smaller red meat so that it is possible to make longer or shorter cut in accordance with the length of the red meat because the conveyor speed is maintained constant. Like the first and second cams 26 and 27, when cam 42 is rotated at a higher speed, the third cam 42 is stopped for a predetermined interval corresponding to the difference between the faster speed and the slowest speed. Accordingly, the cutting operation of the fish body is initiated always at the same instant. As described above, by varying the rotational speed of the third cam 42, it is possible to most efficiently cut the red meat in accordance with the size of the fish body and hence the configuration of the red meat thereof.

In addition to the variation of the rotary speed of the third cam 42, the cutter 48 is moved in the direction perpendicular to the direction of conveyance of the fish body as well as in the vertical direction together with bearing 44 and rotary shaft 47 by the operations of the left and right position adjusting mechanism and of the vertical position adjusting mechanism 46 so as to vary the cutting depth of the cutter 48 into the red meat over the entire length of the cutter 48 and to vary the vertical position of cutter 48 thereby ensuring more positive cutting of the red meat according to the size thereof.

The driving mechanism for the first, second and third cams is shown in FIG. 7. The mechanism comprises an electric motor 51 which drives a first shaft 53 via a speed reducer 52. The rotation of shaft 53 is transmitted to a second shaft 74 through bevel gears 54 and 55 for driving the conveyor 2 (not shown in FIG. 7). A cam 63 mounted on one end of second shaft 74 is set to complete one revolution as the conveyor 2 is moved one pitch. The rotation of the first shaft 53 is transmitted to the input pulley 78 of a stepless speed changing mechanism 77 via a sprocket wheel 75 mounted on the first shaft 53, an endless chain 76, a sprocket wheel 57 and a direction reversing mechanism 58 so as to rotate an output pulley 60 through an endless belt 59. The output pulley 60 is coupled to a one revolution clutch 61 which is constructed to stop its output shaft at each one revolution. When the speed in increased by the operation of a speed changing hand wheel 62 provided for the input pulley 78, a limit switch 64 operated by the cam 63 mounted on the second shaft 74 at each revolution thereof generates an electric signal which is used to drive again the output side. However, when the second shaft 74 and pulley 60 on the output side complete one rotation at the same time, the output side tends to stop. However, as the signal of redriving is applied the output side continues to rotate without stopping. Above described speed changer 77, clutch 61, cam 63, and limit switch 64 cooperate to constitute a rotary speed adjusting mechanism generally designated by a reference numeral 50. A gear 65 mounted on the output shaft of clutch 61 drives the fourth shaft 70 and the fifth shaft 71 via a gear 66, a third shaft 67, gears 68 and 69 mounted on shaft 67, and gears 72 and 73 mounted on the fourth and fifth shafts 70 and 71, respectively. The fourth and fifth shafts drive the first to third cams for operating the upper and lower knives on the opposite sides of conveyor 2 and the rotary cutter for cutting the deepest portion of the red meat.

Accordingly, by operating the speed changing hand wheel 62 of the endless speed changing mechanism in accordance with the size of the fish body or its red meat the rotary speed on the output side of one revolution clutch 61 is changed thereby adjusting the rotary speeds of the first to third cams in a manner as above described. When the speeds of these cams are increased, after one complete revolution the first to third cams are always stopped for an interval equal to the difference in the time required for making one complete revolution at a faster speed and at the slowest speed respectively. Since the conveyor is driven at a constant speed, by conveying the section of the fish body at a constant pitch, the timing of commencing the operation of the cams can be matched with the pitch for each treatment.

Since the size of the fish body is generally uniform for each haul, the operations of the speed changing hand wheel 62 and another adjusting mechanisms are not required to be frequent.

In this invention, the upper and lower knives may be located at the same position or different positions along the conveyor. Further, either the upper and lower knives or the rotary cutter for cutting the deepest portion of the red meat may be located to firstly act upon the sections of the fish body.

As described above, according to this invention the rotary speeds of the cams adapted to displace the upper and lower knives in accordance with the size or configuration of the red meat are adjusted in accordance with the size of the fish body or the red meat thereof so that it is possible to efficiently remove substantially all portions of the red meat without removing the white meat. Thus, it is possible to save the cost of preparing a number of cams of different size and the labor of exchanging the cams.

Further, according to this invention, in addition to the adjustment of the rotary speeds of the cams, since the basic positions of the upper and lower knives are adjusted in accordance with the size of the fish body it is possible to accurately and nearly completely remove red meats of varying size without leaving a portion of the red meat unremoved or removing the white meats.

During the operation of the apparatus described hereinabove the section of the fish body is held by needles 14 of the supporting plate 13 and one of the side conveyors but where the meat is hard, due to the resistance to the cutting operations of the upper and lower knives 9 and 10 and rotary cutters 11, the section 15 of the fish body tends to rise away from supporting plate. As above described although the knives and rotary cutters are displaced by their associated cams in accordance with the size or configuration of the red meat, when the section of the fish body rises, the knives and rotary cutters can not perform precise cutting operation of the red meat thus leaving a portion thereof or cutting the white meat.

Figure 8:
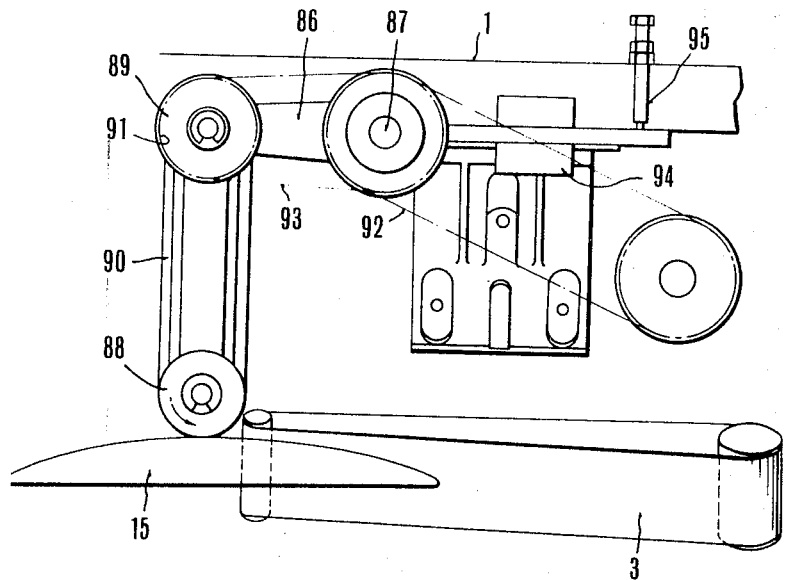
FIG. 8A shows a vertical section of a modified apparatus utilizing a press roller mechanism for holding the fish body section in the working position while it is cut by the upper and lower knives or by the rotary cutter.
FIG. 8B shows a side view of the press roller mechanism employed in the modified apparatus shown in FIG. 8A.
FIG. 8C shows a top plan view, partly in section, of the press roller mechanism shown in FIG. 8B.
Figure 8:
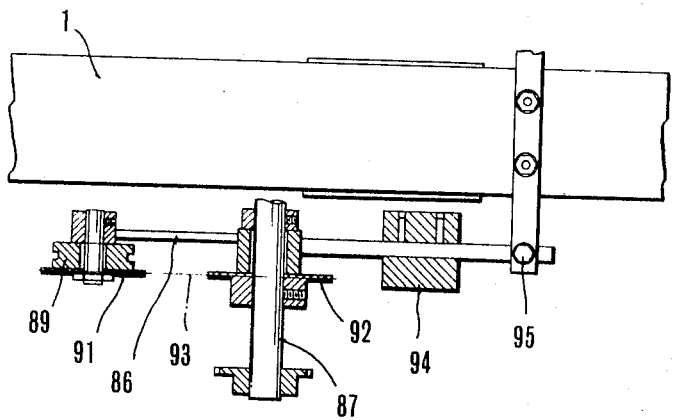

In a modified embodiment shown in FIGS. 8A, 8B and 8C press rollers are used for urging the section of the fish body against the supporting plate with a relatively small force of a magnitude not to crush the fish body when it is cut by the upper and lower knives and by the rotary cutter, whereby accurate cutting and removal of the red meat are assured.

As shown in FIG. 8A, a press roller mechanism generally designated by a reference numeral 85 is associated with each one of the upper and lower knives 9 and 10 and rotary cutters 11 to urge from upper the section 15 of the fish body against the supporting plate 13. More particularly, as shown in FIGS. 8A, 8B and 8C, the press roller mechanism comprises a letter L shaped lever 86 mounted upon frame 1 by means of a driving shaft 87, a press roller 88 rotatably mounted on the lower end of lever 86, and a pulley 89 mounted on the knee of the L-shaped lever 86. Press roller 88 and pulley 89 are operatively connected by an endless belt 90 passing therearound. A sprocket wheel 91 coaxial with pulley 89 is operatively connected with a sprocket wheel 92 mounted on driving shaft 87 through an endless chain 93. A counter-weight 94 is mounted on the righthand end of the L-shaped lever 86 to be adjustable in the horizontal direction as viewed in FIGS. 8B and 8C. An adjusting screw 95 is inserted through frame 1 to engage the righthand end of lever 86.

In operation, by operating the adjusting screw 95, the L-shaped lever 86 is set such that the press roller 88 engage the upper surface of the portion of the section 15 having the minimum thickness. The driving shaft 87 is rotated to rotate the press roller 88 in the counter-clockwise direction as shown by an arrow in FIG. 8B in synchronism with the conveyor speed, thereby urging downwardly the fish body section 15 against the supporting plate 13. The pressure applied to section 15 by press roller 88 is adjustable by adjusting the position of the counterweight along the L-shaped lever 86. With this construction, the tendency of the fish body section to rise caused by the cutting resistance of hard meat can be prevented so that the cutting operations of the upper and lower knives and rotary cutters are performed as desired. Consequently, substantially all portions of the red meat can be removed without removing white meat. Since the press roller 88 is tiltable in a vertical plane and is urged against the fish body section by its own weight, it can follow the variation in the contour of the fish body section as it is conveyed while always applying downward pressure of the magnitude sufficient to prevent upward movement of the fish body section but not to crush the same.

Figure 9:
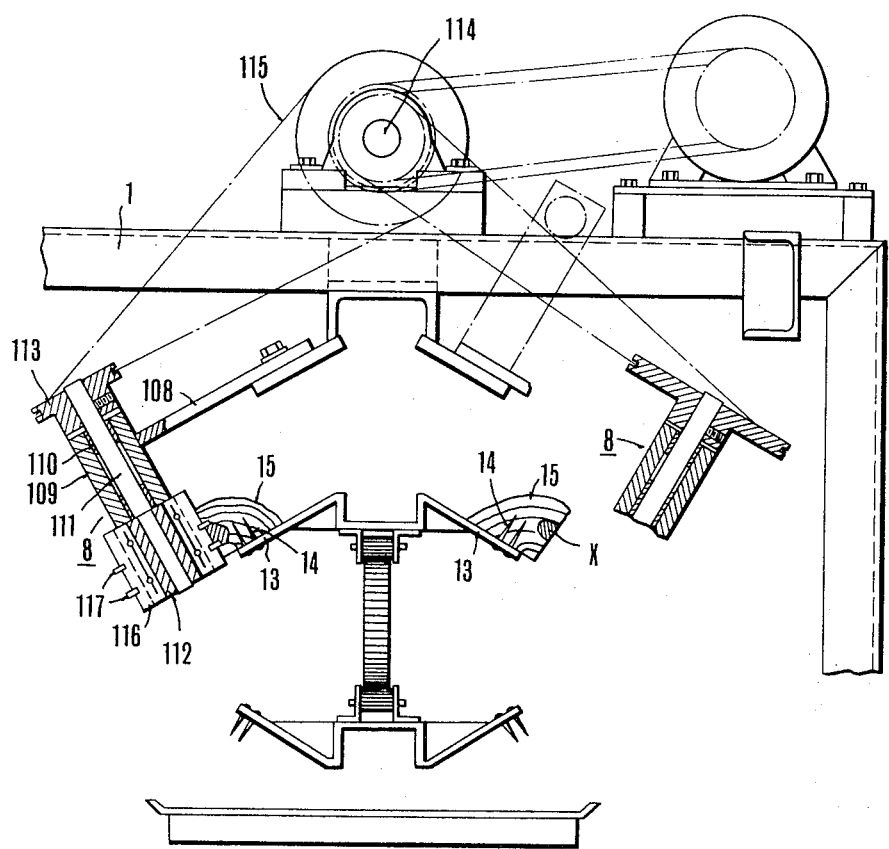
FIG. 9 is a cross-sectional view of the apparatus utilizing a modified rotary cutter for removing small bones.
Figure 10:
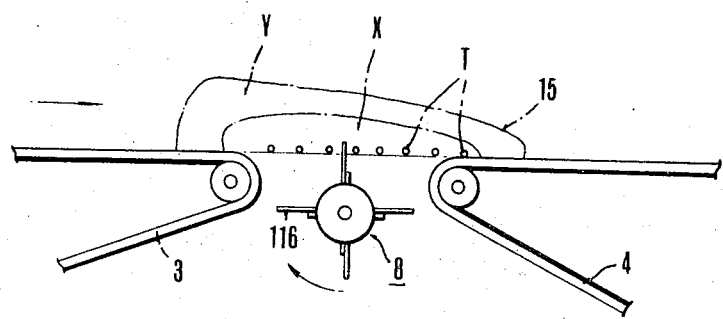
FIG. 10 is a diagram to explain the relationship between side belts and a rotary cutter for removing small bones.

FIGS. 9 to 12 show improved constructions of the rotary cutter 8 for removing small bones. Prior rotary cutter 8 uses cutter blades having straight cutting edges. With such cutter blades although it is possible to efficiently remove the small bones and to finish smooth and flat the outer surface of the fish body section where the small bones are scattered in the surface layer of the red meat, where the small bones are contained in relatively deep portions of the red meat or where the small bones are firmly bonded to the meat it is necessary to remove excess quantity of the meat or it is difficult to completely remove the small bones. In the improved rotary cutters shown in FIGS. 9 to 12 cutter blades having serrated cutting edges are used. In the modified embodiment shown in FIG. 9, boiled fish body sections 15 are mounted on supporting plates 1 with their red meats X faced outwardly. As shown in FIG. 10 each fish body section 15 is guided by side belt conveyors 3 and 4 and the rotary cutter 8 is positioned between these side belt conveyors.

Figure 11:
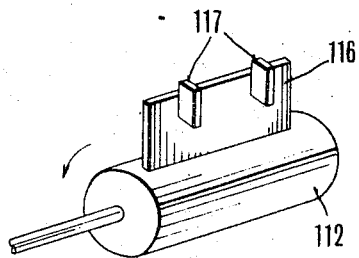
FIG. 11 is a perspective view of the rotary cutter shown in FIG. 9.

As shown by FIG. 9, each rotary cutter 8 comprises a cylindrical support 112 secured to the lower end of a rotary shaft 111 journalled by bearings 110 in a bearing sleeve 109 supported by a bracket 108. On the upper end of shaft 111 is secured to a pulley 113 which is driven by a driving shaft 114 through an endless belt 115. As shown in FIGS. 10 and 11, a plurality of cutting blades 116 are received in the cylindrical support 112 in the radial direction thereof. As best shown in FIG. 11, a plurality of auxiliary rectangular cutting chips 117 are secured on the outer cutting edge of each cutting blade 116 to slightly project beyond the cutting edges thereof. When the rotary cutter 8 is rotated in the clockwise direction as viewed in FIG. 10 or in the same direction as that of conveyance of the fish body section 15, the cutting edges of the cutting blades 116 cut and remove a relatively thin surface layer of the red meat together with small bones contained therein to provide relatively flat and smooth surface while at the same time auxiliary cutting chips 117 cut and remove small bones which are contained in relatively deep portions of the red meat.

Figure 12:
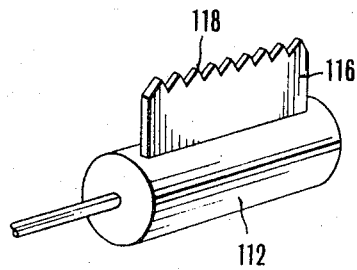
FIG. 12 is a view similar to FIG. 11 but using a modified cutting bade.

FIG. 12 shows a modified cutting blade 116 having a serrated cutting edge. Although this cutting blade can not provide the surface as smooth as that provided by the cutting blade shown in FIG. 11, it can efficiently remove small bones without excess cutting of the fish meat. This cutting blade is especially suitable where the small bones are contained in the surface layer of the red meat or where surface layer of the fish meat is relatively hard and the samll bones are firmly embedded therein.

The axial length of the cutting blade 116 is made sufficiently long to treat fish bodies having the maximum size. Instead of providing in the radial direction, the cutting blade may be provided at an angle with respect to the longitudinal axis of the cylindrical support 112 or in the helical direction.

FIGS. 13 and 14 illustrate an improved small bone removing device including a cutter shifting mechanism for moving the rotary cutter for removing small bones in a direction perpendicular to the direction of conveyance of the section of fish body and a mechanism for varying the angle of the rotary cutter at which the rotary cutter engages the fish meat.

The relation between the section of fish body 15 and the rotary cutter 8 shown in FIG. 13 is the same as that shown in FIG. 9. Again the shaft 111 of rotary cutter 8 is rotated by a pulley 114a secured on the driving shaft 114 through an endless belt 115 and the pulley 113 mounted on the upper end of shaft 111. The tension of belt 115 is adjusted by a tension pulley 120 which is mounted on frame 1 so as to be adjustable in the verticle direction.

Mechanism 121 for varying the angle of the rotary cutter comprises a holder 122 which is clamped to sleeve 109 of the rotary cutter by bolts 123 and 124. By loosening these bolts the sleeve 109 and hance the rotary cutter may be rotated about the bolt 123 so as to vary the contact angle of the rotary cutter 8 to the outer surface of the section of fish body 15. To permit this adjustment, the holder 122 is provided with an arcuate slot 125 through which the bolt 124 extends.

Mechanism 125 for shifting the rotary cutter 8 in the direction perpendicular to the direction of conveyance of the fish body section 15 comprises a bracket 126 secured to frame 1, and a connecting piece 127 secured to the bracket 126. The outer end of the holder 122 is secured to connecting piece 127 by a pair of bolts 128 and 129. When these bolts are loosened it is possible to move the holder 122 and hence the cutter 8 in the direction perpendicular to the direction of conveyance of the fish body section. To this end, an elongated slot 130 is provided through the holder 122 to receive the bolt 129. As shown in FIG. 14, a cutter cover 131 may be provided to cover the rotary cutter 8.

With the mechanisms shown in FIGS. 13 and 14, it is possible to vary the cutting depth and cutting angle of the rotary cutter 8 to the fish body section in accordance with the size of the fish body. For example, the cutting depth of the rotary cutter is adjusted in proportion to the size of the fish body. Since the size of the fish body is generally uniform for each haul and since the configurations of the red meat and small bones are similar to fishes of the same kind, it is not necessary to frequently adjust the position and contact angle of the rotary cutter with respect to the fish body sections.

While the invention has been shown and described in terms of some preferred embodiments thereof, it should be understood that many changes and modifications may be made within the true spirit and scope of the invention as defined in the appended claims.

What is claimed is:

1. Apparatus for automatically cutting and removing the red meat portion of a fish body comprising conveyor means for successively conveying longitudinally split sections of a fish body, red meat removing means located on one side of said conveyor means and including a pair of upper and lower knife blades for cutting and removing said red meat, wherein said upper knife blade is inclined downwardly and said lower knife blade is inclined upwardly, and a plurality of cam means, one for each said knife blade, for displacing said knife blades with respect to said red meat in accordance with the configuration thereof, each cam means including a first cam for adjusting the inclination angle of its respective knife blade, a second cam for adjusting the cutting depth of its respective knife blade, and a driving mechanism for said first and second cams, wherein said driving mechanism includes means for varying the rotary speeds of said cams in accordance with the length of said red meat such that said cams complete one revolution for said section of a fish body and for stopping said cams for a predetermined interval in a timed relationship with the speed of said fish body sections on said conveyor means.

2. The apparatus according to claim 1, further comprising a first rotary cutter adapted to cut the deepest portion of said red meat in a plane disposed within an angle formed by said inclined knife blades.

3. The apparatus according to claim 2, further comprising a second rotary cutter for removing small bones contained in the surface portion of said red meat, said second rotary cutter being positioned ahead of said pair of knives and said first rotary cutter so that the red meat is cut and removed after the small bones have been removed therefrom by said second rotary cutter.

4. The apparatus according to claim 3, wherein said second rotary cutter for removing small bones comprises a cylindrical support and a plurality of cutting blades supported by said cylindrical support to extend generally in the radial direction thereof.

5. The apparatus according to claim 4, wherein the cutting edge of each cutting blade is serrated.

6. The apparatus according to claim 4, wherein each cutting blade has a linear cutting edge and a plurality of auxiliary cutting chips protruding beyond said cutting edge.

7. The apparatus according to claim 4, which further includes means for moving said rotary cutter for removing small bones in a direction substantially perpendicular to the direction of conveyance of the split section of the fish body and means for varying the contact angle of said cutting blades with respect to the red meat of said split section.

8. The apparatus according to claim 1, wherein each respective cam means further comprises a base for rotatably supporting said first and second cams; a rotatably mounted arcuate holder having the knife associated with said respective cam means fixed thereto; a sector gear mounted for rotatably driving said arcuate holder; a plate slidably supported on said base and having said sector gear rotatably mounted thereon; a first cam follower coupled to said sector gear and operatively mounted for movement in accordance with the rotation of one of said cams associated with said respective cam means; a second cam follower mounted for engagement by the other of said cams associated with said respective cam means for moving said slidable plate on said base in a direction perpendicular to the direction of conveyance of said split sections of the fish body.

9. The apparatus according to claim 1, wherein said red meat removing means includes a rotary cutter for cutting the deepest portion of said red meat, supporting means for said rotary cutter, and adjusting means for moving said rotary cutter supporting means in a direction perpendicular to the direction of conveyance of said split sections of said fish body.

10. The apparatus according to claim 1, wherein said conveyor means comprises a conveyor, a plurality of fish body supporting plates carried by said conveyor, each one of said supporting plates being provided with needles on its upper surface adapted to pierce a said split section of the fish body, and a plurality of side conveyors extending in the direction of movement of said conveyor, said side conveyors being adapted to engage the red meat of the split sections of the fish body mounted on said supporting plates.

11. The apparatus according to claim 1, which further includes a fish body supporting plate mounted on said conveyor means and fish body press means located at the working positions of said knife blades for pressing said split sections of the fish body against said fish body supporting plate, said press means including a lever, means to swing said lever in a vertical plane, and a press roller rotatably mounted on said lever.

* * * * *

UNITED STATES PATENT OFFICE
CERTIFICATE OF CORRECTION

Patent No. 3,840,939　　　　　　　　　　Dated October 15, 1974

Inventor(s) NORIO YAMANASHI

It is certified that error appears in the above-identified patent and that said Letters Patent are hereby corrected as shown below:

Column 1, line 37,　"reat Z" should read --meat X--;

Column 1, line 39,　"X" should read --Z--;

Column 9, line 64,　"samll" should read --small--.

Signed and sealed this 24th day of December 1974.

(SEAL)
Attest:

McCOY M. GIBSON JR.　　　　　　　C. MARSHALL DANN
Attesting Officer　　　　　　　　Commissioner of Patents